Aug. 4, 1953

L. G. OPEL ET AL 2,648,044

VOLTAGE REGULATING GENERATOR

Filed Oct. 13, 1948

WITNESSES:
Wm. B. Sellers.
Rev. L. Groome

INVENTORS
Lawrence G. Opel and
William R. Harding.
BY
Paul E. Friedemann
ATTORNEY Aug. 4, 1953   L. G. OPEL ET AL   2,648,044
VOLTAGE REGULATING GENERATOR
Filed Oct. 13, 1948   2 Sheets-Sheet 2
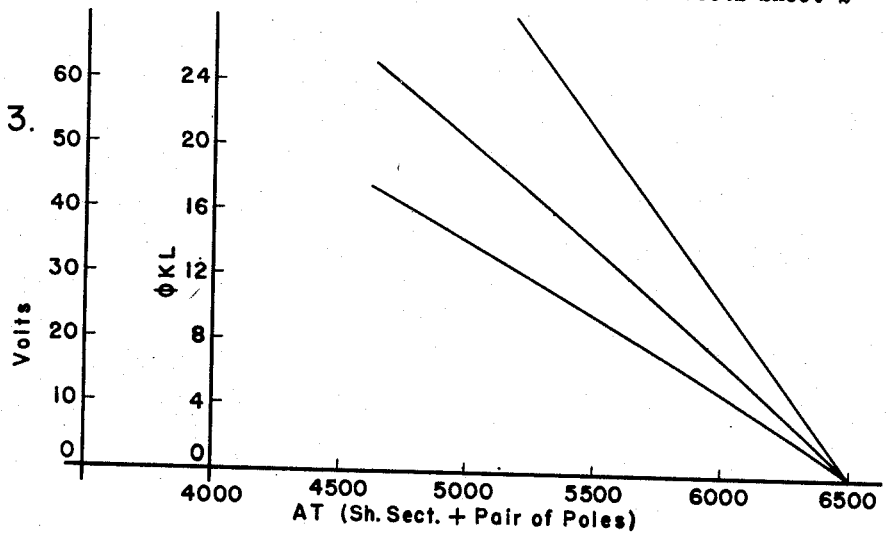
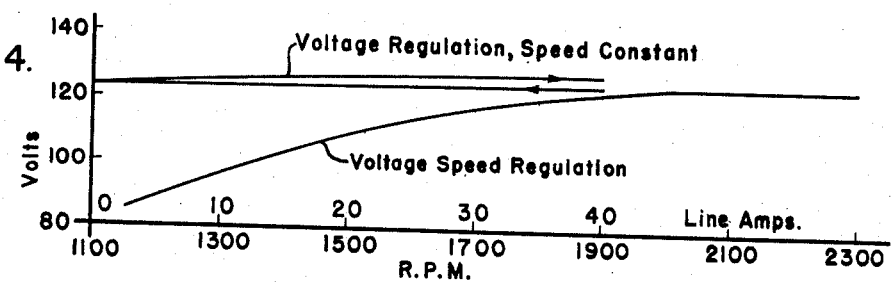
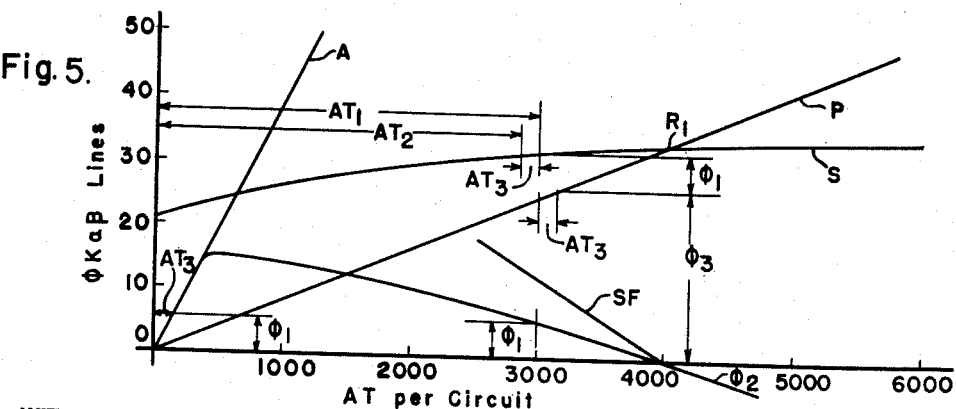
WITNESSES:
INVENTORS
Lawrence G. Opel and
William R. Harding.
BY
ATTORNEY

UNITED STATES PATENT OFFICE 2,648,044

VOLTAGE REGULATING GENERATOR

Lawrence G. Opel, Akron, and William R. Harding, East Aurora, N. Y., assignors to Westinghouse Electric Corporation, East Pittsburgh, Pa., a corporation of Pennsylvania Application October 13, 1948, Serial No. 54,244

18 Claims. (Cl. 322—59)

Our invention relates to electric control systems and more particularly to regulating generator apparatus for maintaining the output voltage of a dynamo-electric machine substantially constant despite changes in speed of the dynamo-electric machine.

The electric apparatus for a power shovel is usually driven from a diesel engine, or from an alternating-current motor, as an induction motor coupled to suitable supply lines. Since the character of the load is such that extreme speed variations are produced on the prime mover, it is apparent that any electric generator coupled to such engine or induction motor will be subject to considerable speed variations.

If an increase in load on the boom motor or the hoist gear, or both, decreases the speed of the main generator and such decrease in speed has the added effect of reducing the generator voltage, as is normally the case, it is apparent that the voltage regulation is extremely poor. The use of voltage regulating equipment is thus highly desirable, but the usual voltage regulators on the market are not designed to function properly under the mechanical shock conditions present on a shovel.

One broad object of our invention is the provision of electric current generating means that inherently provide voltage regulation.

Another broad object of our invention is the provision of a regulating generator whose voltage output increases with a decrease in generator excitation.

It is also an object of our invention to provide an excitation effect on an exciter generator from a regulating generator operating at the same speed as the exciter generator such that the exciter generator excitation increases with a decrease in speed of the generators.

The objects recited are merely illustrative. Other objects and advantages will become more apparent from a study of the following specification and the accompanying drawings, in which:

Figs. 3, 4 and 5 show some curves of value in disclosing our invention.

Figure 1:
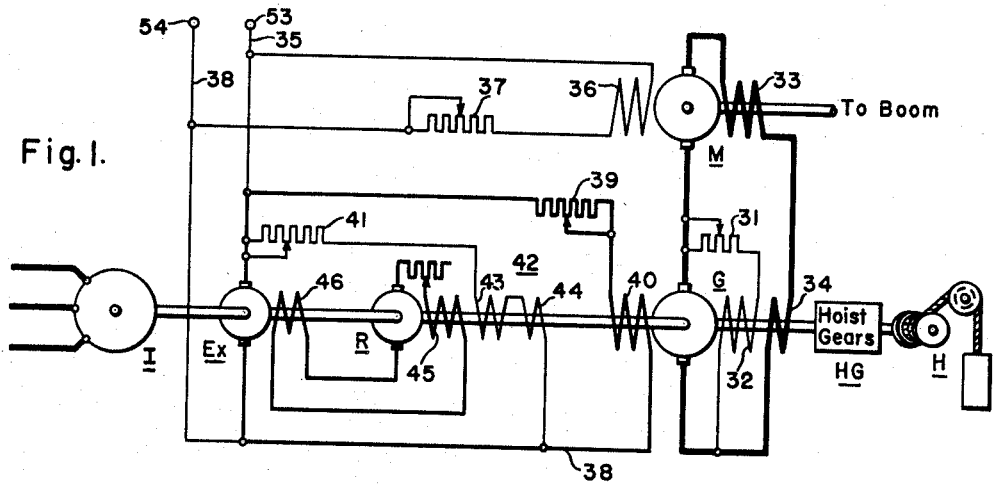
Figure 1 is a schematic view of a wiring diagram showing our invention in a typical application.

In Figure 1, the prime mover as a diesel engine, induction motor, etc., is indicated by I. This prime mover is coupled to drive the main exciter Ex, the regulating generator R, the main generator G, and the hoist gear HG coupled to drive the hoist equipment H. The main generator G is coupled in a loop circuit to the boom motor M.

The main generator is provided with a rheostat 31 and shunt field winding 32 connected directly across the armature of the main generator G. The loop circuit for the generator G and motor M also includes a motor series field winding 33 and a generator series field winding 34.

The main exciter Ex is coupled to the prime mover and from its leads 35 and 38 supplies excitation to the motor field 36 through rheostat 37. An energizing circuit is also established from lead 35 through the rheostat 39, main generator field 40 to lead 38. A still other energized circuit is established from lead 35 through rheostat 41, regulating field 42, including field component as field 43 and a pattern field component 44, back to lead 38.

The regulating generator coupled to be driven from the prime mover partakes of the speed of the main drive shaft, but its voltage does not vary with speed. This function will become apparent presently.

The regulating generator armature is connected in a loop circuit including, in addition to its own armature, its own differential series field 45 and the field winding 46 of the exciter Ex. This field winding usually includes in its series circuit the commutating windings 51 and 52. The differential series field winding 45 includes the coil windings 47, 48, 49 and 50 wound differentially with respect to the coil windings 14, 16, 17 and 19 on the poles 2, 3, 4 and 5 and comprising the field winding 43.

The exciter also supplies other loads, as the lights on the shovel, from the terminals or leads 35 and 38 as evidenced by the switch points or connectors 53 and 54.

Our system of control, without the use of any separate voltage regulating equipment which may be easily damaged on equipment subject to shocks as shovels, drilling rigs, etc., provides voltage regulation for the generating machines used. Just how this is accomplished may be more readily understood from a study of the mechanical and electrical characteristics of the regulating generator used to provide excitation.

Figure 2:
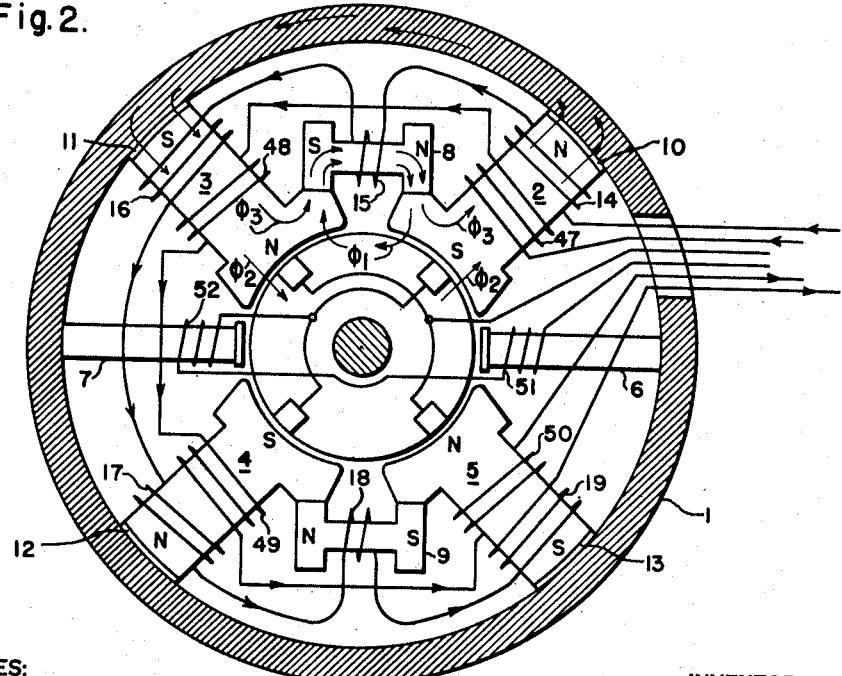
Fig. 2 is a somewhat schematic showing of the excitation circuits, and the magnetic circuit of the regulating generator utilized in our regulating system.

The showing in Fig. 2, while somewhat schematic, represents an end view partly in section of the frame, pole structures, and armature of the regulating generator R. This regulating generator has a substantially conventional frame structure 1, but the pole structure includes the main poles 2, 3, 4 and 5, the commutating poles 6 and 7, and the I-shaped frame members, or pole sections 8 and 9.

The adjacent pole tips of poles 2 and 3 are shaped to receive the edge ends of the I-shaped pole section 8, as shown, and the adjacent pole tips of the poles 4 and 5 are similarly shaped to receive the edge ends of the I-shaped pole section 9, as shown. The structure of the pole tips and the pole sections is such that there is substantially no air gap at the contact regions. In short, the reluctance is kept down to a minimum. Further, the I-shaped pole sections 8 and 9 are made from a material with very good magnetic properties.

The structure of the mounting for the main poles is such that high reluctance gaps are provided at the junction between the frame 1 and outer ends of the poles 2, 3, 4 and 5. One of the most effective means of obtaining a relatively high reluctance gap is by means of the use of rather thick copper or preferably brass shims, as the shims 10, 11, 12 and 13. The air gap between the armature and the main poles remains conventional. The armature thus provides a first magnetic member of relatively large magnetically effective sectional area disposed in bridging relation to the pole ends through the air gaps shown. The sections 8 and 9, on the other hand, provide a second magnetic member disposed in magnetic bridging relation with respect to the adjacent enlarged heels and toes of the poles.

Current carrying coils 14, 16, 17 and 19 are wound on the main poles 2, 3, 4 and 5 respectively and current carrying coils 15 and 18 are wound on the I-shaped sections 8 and 9, respectively. All these current carrying coils 14 to 19, inclusive, are connected in series and may be considered the main field winding. The coils are so wound that the main poles and pole sections have the polarities indicated.

Three flux paths, as the paths $\phi_1$, $\phi_2$ and $\phi_3$, are thus produced through the magnetic circuits of the machine, excluding leakage flux paths, as indicated in Fig. 2. Assume that the ampere turns of each of the coils 14, 16, 17 and 19 are equal and are in each case equal to the ampere turns in the coils 15 and 18. Since the sectional area of the pole sections 8 and 9 is considerably less than the sectional area of the main poles 2, 3, 4 and 5, it is apparent that the sections 8 and 9, for the same magnetomotive force, will saturate long before the main poles saturate.

In fact, the arrangement is such that in use the sections 8 and 9 are operated highly saturated, whereas the main poles 2, 3, 4 and 5 are unsaturated. Further, the ampere turns for most effective use of the machine designated R as a regulator, are so adjusted that a magnetomotive force is produced in one of the magnetic circuits including the section 8, for example, that is just sufficient to supply all the flux passing through the shims 10 and 11. This means $\phi_3$ is the only flux produced. There is thus no flux $\phi_1$, and no flux $\phi_2$. Since there is no flux $\phi_1$ and $\phi_2$, there is no voltage at the armature terminals of the regulator generator R. For any increase in current in the field there will appear a flux $\phi_2$, but for any decrease in current in the field there will appear a flux $\phi_1$. In other words, as the ampere turns are reduced, the flux $\phi_3$ is reduced, and therefore the flux through pole section 8 reduced. A reduction of the flux through section 8 will result in a magnetomotive force appearing across the armature air gap, and thus a flux $\phi_1$ will flow producing an armature voltage.

This reduction in flux through pole section 8 results in a magnetomotive force across the armature air gap because section 8 is saturated, and the ampere turns required to carry the reduced flux are much less than the ampere turns available in its field coil 15.

This may be still more apparent from a study of the curves shown in Fig. 5. In this Fig. 5, the armature saturation curve A is shown rather steep; the saturation curve P for the main poles is rather low and slanting, whereas the saturation curve S of, say, the pole section 8 is rather flat, or almost horizontal at point R1, the regulation point. The design of the parts and the selection of the current in the coils 14 to 19, inclusive, is such that the saturation curves shown are obtained.

If R1 is the regulation point, it is apparent that if the field current in the field is reduced, the flux through the main poles 2, 3, 4 and 5 will slip down toward the origin along the curve P, but the flux through pole section 8 will slip to the left from point R1 along the curve S. The difference in vertical height between curves P and S less the drop of S, thus represents $\phi_1$, and thus the rise in voltage of the regulating generator R.

Still another somewhat general way of explaining the flux $\phi_1$ is that as the ampere turns of the main poles are reduced, the flux $\phi_3$ becomes less since the ampere turns around its circuit are less. The ampere turn drop in section 8 becomes much less, and ampere turns are now available from the coil 15 on section 8 to produce flux $\phi_1$ through the path indicated to thus produce a voltage at the armature terminals. A condition is thus produced whereby the armature flux increases as the ampere turns, namely, the excitation, decreases. The saturation curves shown in Fig. 3 are thus produced.

Various combinations of fields, air gaps, and types of excitation may be used to obtain the slope of saturation curve desired and to provide the intelligence for regulating purposes. Further, the operation will normally be to the left of point R1. Also, a series field will usually be used, which series field may be provided with an adjustable shunt as shown in Fig. 1.

In some of the actual uses made of our invention, a series field, represented by the coil windings 47, 48, 49 and 50 shown in Fig. 2, was used. The series field is wound differential to the main field to thus provide a steep slope to the saturation curve. The change effected by the series differential field is illustrated by the curve SF shown in Fig. 5.

Separate excitation could be used on the pole sections 8 and 9 to also give a steep slope to the effective saturation curve of the regulating generator R.

As noted from the showing in Figs. 1 and 2, the coil windings 14, 16, 17 and 19 on the poles 2, 3, 4 and 5 are connected in series with the coil windings 15 and 18 on the pole sections 8 and 9, and this series circuit is connected in series with the armature of the exciter Ex, the generator whose voltage is to be regulated. The regulating generator thus, through the field winding, excites the exciter Ex whose voltage is being regulated.

As the speed of the machines drops, by reason of an increase of load on the hoist H, the boom motor M, or both, the voltage output of the exciter tends to drop, but since such decrease in exciter voltage causes a decrease of the current in the field coils 14 to 19, inclusive, the voltage of the regulating generator increases and thus keeps the voltage of the exciter from dropping anywhere near as much as it would drop without the regulating generator R.

From the foregoing and the curves shown in Figs. 3, 4 and 5, it will be apparent that we provide means for automatically maintaining the voltage of a main generator within rather narrow limits for wide changes in speed of the machines forming part of our regulation control, and yet no additional equipment, such as voltage regulators, is needed.

While we have shown but one embodiment of our invention, it will be obvious to those skilled in the art that our system of control and regulation is susceptible to modification in various respects without departing from the main features and spirit of our invention as herein explained and shown in the drawings, all within the scope of the claims hereto appended.

We claim as our invention:

1. In a system of control in combination, a dynamo-electric machine having a frame, a pair of adjacently disposed poles, an armature structure and armature winding thereon, a heel element on one pole, a generally similarly shaped toe element on the other pole to thus be disposed adjacent the heel element on the first pole, a magnetic shunt bridging said two elements, a generator, an armature winding for said generator, a field winding for said generator, a coil on each of said poles and a coil on the shunt, said coils being connected in series with each other and with the armature winding of said generator, shims between the poles and the frame to provide a relatively high reluctance gap between the poles and the frame, the transverse dimensions of the poles being such that a given current in the coils and field winding saturates the magnetic shunt but falls considerably short of saturating the poles, whereby a decrease of the current in said coils causes a voltage to be produced in the armature winding of said dynamo-electric machine that increases with a decrease of the current in said coils, and circuit means for connecting the field winding of said generator to the armature winding of said dynamo-electric machine.

2. In a voltage regulating control comprising in combination, a closed magnetic circuit including a frame of magnetic material and having a relatively large sectional area, a pair of magnetic members of relatively large sectional area projecting from said frame in the same general direction, shims of non-magnetic material disposed between the frame and each projecting member to provide a high reluctance gap, a first magnetic member of relatively large sectional area disposed in magnetic bridging relation, through a pair of air gaps, with respect to the free ends of said projecting members, a second magnetic member of relatively small sectional area disposed in magnetic bridging relation with respect to adjacent parts displaced from the free ends of said projecting members, means for producing additively acting magnetomotive forces of such magnitude in the projecting members and the second magnetic member to just saturate the second magnetic member but not to saturate the projecting members, whereby no flux is caused to flow in the first magnetic member, and means for increasing the magnetomotive forces to cause a flux to flow in the first magnetic member.

3. In a voltage regulating control comprising in combination, a closed magnetic circuit including a frame of magnetic material and having a relatively large sectional area, a pair of magnetic members of relatively large sectional area projecting from said frame in the same general direction, shims of non-magnetic material disposed between the frame and each projecting member to provide a high reluctance gap, a first magnetic member of relatively large sectional area disposed in magnetic bridging relation, through a pair of air gaps, with respect to the free ends of said projecting members, a second magnetic member of relatively small sectional area disposed in magnetic bridging relation with respect to adjacent parts displaced from the free ends of said projecting members, means for producing additively acting magnetomotive forces of such magnitude in the projecting members and the second magnetic shunting member to just saturate the second magnetic member but not to saturate the projecting members, whereby no flux is caused to flow in the first magnetic member, means for increasing the magnetomotive forces to cause a flux to flow in the first magnetic member, and means for producing a voltage as a function of the magnitude of the flux in the first magnetic shunting member.

4. In a voltage regulating control comprising in combination, a closed magnetic circuit including a frame of magnetic material and having a relatively large sectional area, a pair of magnetic members of relatively large sectional area projecting from said frame in the same general direction, shims of non-magnetic material disposed between the frame and each projecting member to provide a high reluctance gap, a first magnetic member of relatively large sectional area disposed in magnetic bridging relation, through a pair of air gaps, at the free ends of said projecting members, a second magnetic member of relatively small sectional area disposed in magnetic bridging relation at parts displaced from the free ends of said projecting members, means for producing additively acting magnetomotive forces of such magnitude in the projecting members and the second magnetic member to just saturate the second magnetic member but not to saturate the projecting members, whereby no flux is caused to flow in the first magnetic shunting member, means for increasing the magnetomotive forces to cause a flux to flow in the first member, means for producing a voltage as a function of the magnitude of the flux in the first magnetic shunting member, and generating means responsive to said voltage for altering the magnetomotive forces as a function of the output voltage of the said generating means.

5. In an electric regulating system, in combination, a regulating generator having a frame, a rotor, four poles, and two magnetic shunts, one of the shunts being disposed between one pair of poles of opposite polarity in the space between the rotor and frame and the other being disposed between the other pair of poles of opposite polarity in the space between the rotor and frame, the shunts being designed to have good magnetic contacts with the poles and being of considerable lesser sectional area to thus become saturated more readily than the poles, relatively thick shims between the frame and poles, a controlled generator, and means for exciting the poles and shunts as a function of the voltage of said controlled generator, and field means for the controlled generator connected to the regulating generator to thus have its excitation increased with a decrease of the excitation of the poles and shunts.

6. In an electric regulating system, a regulating generator having a frame, a rotor, and four poles, relatively thick shims between the frame and the poles to provide high reluctance gaps, said rotor being spaced from the poles to provide rather narrow air gaps, the heel of one pole and the toe of the second pole being shaped to receive a magnetic shunt in spaced relation to the frame and rotor in the space between the rotor and frame, the heel of the third pole and the toe of the fourth pole being shaped to receive a magnetic shunt in spaced relation to the frame and rotor in the space between the frame and rotor, a magnetic shunt disposed in each of the two places designed to receive them, said shunts being dimensioned to become saturated for a given magnetomotive force which leaves the poles and frame unsaturated, an exciter the voltage output of which is to be regulated, coil means connected to the output circuit of the exciter and disposed on the poles and shunts to thus excite the regulating generator, said regulating generator, by reasons of the structures recited, having the characteristic of increasing its voltage output with a decrease in current in the coil means, and field means for the exciter connected to the regulating generator.

7. In a voltage regulating control for a dynamo-electric machine comprising in combination, a dynamo-electric machine, said machine having a magnetic circuit including a frame of magnetic material and of relatively large sectional area, a pair of pole pieces projecting radially inwardly from the frame and having relatively large sectional area, shims of non-magnetic material disposed between the frame and each pole piece to provide a relatively high reluctance gap, a rotor of relatively low reluctance disposed in magnetic bridging relation, through a pair of air gaps, with respect to the free ends of the pole pieces, windings in the rotor for producing a voltage output, a magnetic shunting member of relatively small sectional area connected to adjacent sides of the pole pieces to thus be in shunting relation to the rotor, magnetizing means for producing additively acting magnetomotive forces in the pole pieces and the magnetic shunting member of a magnitude to just saturate the shunting member but not to saturate the pole pieces, and means for varying the effect of said magnetizing means at any selected rate to vary the voltage output of the rotor winding.

8. In a voltage regulating control for a dynamo-electric machine comprising in combination, a dynamo-electric machine, said machine having a magnetic circuit including a frame of magnetic material and of relatively large sectional area, a pair of pole pieces projecting radially inwardly from the frame and having relatively large sectional area, shims of non-magnetic material disposed between the frame and each pole piece to provide a relatively high reluctance gap, a rotor of relatively low reluctance disposed in magnetic bridging relation, through a pair of air gaps, with respect to the free ends of the pole pieces, windings in the rotor for producing a voltage output, a magnetic shunting member of relatively small sectional area connected to adjacent sides of the pole pieces to thus be in shunting relation to the rotor, magnetizing means for producing additively acting magnetomotive forces in the pole pieces and the magnetic shunting member of a magnitude to just saturate the shunting member but not to saturate the pole pieces, control means for producing a magnetomotive force in the pole pieces acting in an opposite sense to the magnetomotive forces in the pole pieces produced by said magnetizing means, means for varying the effect of said magnetizing means at any selected rate to vary the voltage output of the rotor winding, and means for varying the effect of the control means at a slower rate than said selected rate.

9. A dynamo-electric machine for regulation, in combination, a direct current generator having an armature, and windings thereon, a magnetic circuit for providing a flux through the armature in one sense, said circuit including a frame member, two poles and the armature, the frame member being separated from the outer ends of the poles by relatively high reluctance gaps, a second magnetic circuit for providing a flux through the armature in another sense, said second circuit including a second pole section, the same two poles and the armature, said second pole section being of a much lesser effective sectional area than the effective sectional area of the first magnetic circuit, first field windings for producing a flux in the first magnetic circuit, means for varying the excitation current of the first field windings from zero to saturation of the first magnetic circuit, second field windings for producing a flux in the second magnetic circuit, means for varying the excitation current of the second field winding from zero to saturation of the restricted sectional portion of the second magnetic circuit, the winding direction and current direction in the second field winding being such that the magnetomotive force across the rotor is in opposition to the magnetomotive force produced across the rotor by the first field winding, and circuit means for connecting the first field winding to the armature winding of the generator.

10. A dynamo-electric machine for regulation, in combination, a direct current generator having an armature, and windings thereon, a magnetic circuit for providing a flux through the armature in one sense, said circuit including a frame member, two poles and the armature the frame member being separated from the outer ends of the poles by relatively large air gaps, a second magnetic circuit for providing a flux through the armature in another sense, said second circuit including a second pole section, the same two poles and the armature, said second pole section being of a much lesser effective transverse sectional area than the effective transverse sectional area of the first magnetic circuit, first field windings for producing a flux in the first magnetic circuit, means for varying the excitation current of the first field windings from zero to saturation of the first magnetic circuit, second field windings for producing a flux in the second magnetic circuit, means for varying the excitation current of the second field winding from zero to saturation at the lesser transverse sectional portion of the second magnetic circuit, the winding direction and current direction in the second field winding being such that the magnetomotive force across the rotor is in opposition to the magnetomotive force produced across the rotor by the first field winding, circuit means for connecting the first field winding to the armature winding of the generator, and a controlled generator the voltage of which is to be regulated and driven at the same speed as said direct current generator and having an armature winding connected in series circuit with the said first field winding and having a field winding connected in series with the said second field winding and the windings on the armature of said direct current generator.

11. In a system of control in combination, a dynamo-electric machine having a frame, a pair of adjacently disposed poles, an armature structure and armature winding thereon, a heel element on one pole, a generally similarly shaped toe element on the other pole to thus be disposed adjacent the heel element on the first pole, a magnetic shunt bridging said two elements, a coil on each of said poles and a coil on the shunt, said coils being connected in series with each other and energized in a selected manner, shims between the poles and the frame to provide a relatively high reluctance gap between the poles and the frame, the transverse dimensions of the poles being such that a given current in the coils and field winding saturates the magnetic shunt but falls considerably short of saturating the poles, pole windings connected to the armature windings and disposed on the poles to act in opposition to the coil windings on the poles, whereby a decrease of the current in said pole windings causes a voltage to be produced in the armature winding of said dynamo-electric machine that increases with a decrease of the current in said pole windings.

12. In an electric regulating system, in combination, a regulating generator having a frame, a rotor, voltage producing windings on the rotor, four poles, and two magnetic shunts, one of the shunts being disposed between one pair of poles of opposite polarity in the space between the rotor and frame and the other being disposed between the other pair of poles of opposite polarity in the space between the rotor and frame, the shunts being designed to have good magnetic contacts with the poles and being of considerable lesser sectional area to thus become saturated more readily than the poles, relatively thick shims between the frame and poles, means for variably exciting the poles and shunts, and field winding means on the poles connected to the voltage producing windings on the rotor and acting in opposition to the means for variably exciting the poles, whereby the voltage output increases with a decrease in rotor speed.

13. In an electric regulating system, a regulating generator having a frame, a rotor, windings on the rotor to produce a voltage output, and four poles, relatively thick shims between the frame and the poles to provide high reluctance gaps, said rotor being spaced from the poles to provide rather narrow air gaps, the heel of one pole and the toe of the second pole being shaped to receive a magnetic shunt in spaced relation to the frame and rotor in the space between the rotor and frame, the heel of the third pole and the toe of the fourth pole being shaped to receive a magnetic shunt in spaced relation to the frame and rotor in the space between the frame and rotor, a magnetic shunt disposed in each of the two places designed to receive them, said shunts being dimensioned to become saturated for a given magnetomotive force which leaves the poles and frame unsaturated, first coil means on the poles and magnetic shunt energized for producing a magnetomotive force to saturate the shunts and to produce a closed flux path through the frame, one pole, the shunt, the other pole so long as the magnetomotive force varies from zero to saturation of the shunt, and second coil means connected to the output circuit of the rotor windings and disposed on the poles to thus excite the poles in a sense opposite to the first coil means, said regulating generator, by reasons of the structures recited, having the characteristic of increasing its voltage output with a decrease in current in the second coil means.

14. A dynamo-electric machine for regulation, the combination of, a direct current generator having an armature, and windings thereon, a magnetic circuit for providing a flux through the armature in one sense, said circuit including a member of magnetic material, two poles and the armature, the member being separated from the outer ends of the poles of relatively high reluctance gaps, a second magnetic circuit for providing a flux through the armature in another sense, said second magnetic circuit including a second member of magnetic material, the same two poles, and the armature, said second member having a much lesser transverse sectional area than the transverse sectional area of the first magnetic circuit, first field windings for producing a flux in the first magnetic circuit, means for varying the excitation current of the first field windings from zero to saturation of the first magnetic circuit, second field windings for producing a flux in the second magnetic circuit, means for varying the excitation current of the second field winding from zero to saturation of the restricted sectional portion of the second magnetic circuit, the winding direction and current direction in the second field winding being such that the magnetomotive force across the armature is in opposition to the magnetomotive force produced across the armature by the first field winding, and circuit means for connecting the first field winding to the armature winding of the generator.

15. A dynamo-electric machine for regulation, the combination of, a direct current generator having an armature and windings thereon, a magnetic circuit for providing a flux through the armature in one sense, said magnetic circuit including a member of magnetic material, two poles, and the armature, the member being separated from the outer ends of the poles by relatively high reluctance gaps, a second magnetic circuit for providing a flux through the armature in another sense, said second magnetic circuit including a second member of magnetic material, the same two poles and the armature, said second member having a much lesser effective transverse sectional area than the effective transverse sectional area of the first magnetic circuit, first field windings for producing a flux in the first magnetic circuit, means for varying the excitation current of the first field windings from zero to saturation of the first magnetic circuit, second field windings for producing a flux in the second magnetic circuit, means for varying the excitation current of the second field windings from zero to saturation at the region of the lesser transverse sectional area of the second magnetic circuit, the winding direction and current direction in the second field winding being such that the magnetomotive force across the armature is in opposition to the magnetomotive force produced across the armature by the first field winding, circuit means for connecting the first field winding to the armature winding of the generator, and a controlled generator the voltage of which is to be regulated and driven at the same speed as said direct current generator and having an armature winding connected in series circuit with the said first field winding and having a field winding connected in series with the said second field winding and the windings on the armature of said direct current generator.

16. A dynamo-electric machine for regulation, the combination of, a direct current generator having a magnetic armature and windings thereon, a magnetic circuit for providing a flux through the armature in one sense, said circuit including a member of magnetic material, two poles and the armature, the member being separated from the outer ends of the poles by relatively high reluctance gaps, a second magnetic circuit for also providing a flux through the armature, said second magnetic circuit including a second member of magnetic material, the same two poles and the armature, said second member having a low reluctance connection with said poles and having a lesser transverse sectional area than the transverse sectional area of the first magnetic circuit, first field windings for producing a flux in the first field windings for producing a flux in the first magnetic circuit, means for varying the excitation current of the first field windings from zero to saturation of the first magnetic circuit, second field windings for producing a flux in the second magnetic circuit, means for varying the excitation current of the second field winding from zero to saturation of the restricted sectional portion of the second magnetic circuit, the winding direction and current direction in the second field winding being such that the magnetomotive force across the armature is in opposition to the magnetomotive force produced across the armature by the first field winding.

17. A dynamo-electric machine for regulation, the combination of, a direct current generator having an armature and windings thereon, a magnetic circuit for providing a flux through the armature in one sense, said circuit including a member of magnetic material, two poles and the armature, the member being separated from the outer ends of the poles by relatively high reluctance gaps, a second magnetic circuit for also providing a flux through the armature, said second magnetic circuit including a second member of magnetic material, the same two poles and the same armature, said second member having a lesser transverse sectional area than the transverse sectional area of the first magnetic circuit, and having a low reluctance connection with the poles, first field windings for producing a flux in the first magnetic circuit, means for varying the excitation current of the first field windings from zero to saturation of the first magnetic circuit, second field windings for producing a flux in the second magnetic circuit, means for varying the excitation current of the second field winding from zero to saturation of the restricted sectional portion of the second magnetic circuit, the winding direction and current direction in the second field winding being such that the magnetomotive force across the armature is in opposition to the magnetomotive force produced across the armature by the first field winding, and circuit means for connecting the first field winding to the armature winding of the generator.

18. A dynamo-electric machine for regulation, the combination of, a direct current generator having an armature and windings thereon, a magnetic circuit for providing a flux through the armature in one sense, said circuit including a magnetic member, two poles and the armature, the member being separated from the outer ends of the poles by relatively high reluctance gaps, a second magnetic circuit for also providing a flux through the armature, said second magnetic circuit including a second magnetic member, the same two poles and the same armature, said second member having a lesser transverse sectional area than the transverse sectional area of the first magnetic circuit and having a low-reluctance connection with the poles, first field windings for producing a flux in the first magnetic circuit, means for varying the excitation current of the first field windings from zero to saturation of the first magnetic circuit, second field windings for producing a flux in the second magnetic circuit, means for varying the excitation current of the second field winding from zero to saturation at the restricted sectional portion of the second magnetic circuit, the winding direction and current direction in the second field winding being such that the magnetomotive force across the armature is in opposition to the magnetomotive force across the armature by the first field winding, circuit means for connecting the first field winding to the armature winding of the generator, and a controlled generator the voltage of which is to be regulated and driven at the same speed as said direct current generator and having an armature winding connected in series circuit with the said first field winding and having a field winding connected in series with the said second field winding and the windings on the armature of said direct current generator.

LAWRENCE G. OPEL.
WILLIAM R. HARDING.

References Cited in the file of this patent

UNITED STATES PATENTS

| Number | Name | Date |
| --- | --- | --- |
| 1,750,713 | Hobart | Mar. 18, 1930 |
| 2,058,339 | Metzger | Oct. 20, 1936 |
| 2,080,388 | Langkau | May 11, 1937 |
| 2,256,239 | Caldwell | Sept. 16, 1941 |
| 2,383,971 | Ivy | Sept. 4, 1945 |
| 2,431,252 | Hornbarger | Nov. 18, 1947 |